(12) United States Patent
Ortiz et al.

(10) Patent No.: US 7,188,376 B2
(45) Date of Patent: Mar. 13, 2007

(54) FLEXIBLE SLEEVE FOR CONNECTION TO A PLUMBING FIXTURE

(75) Inventors: Evodio Ortiz, Santa Catarina (MX); Jorge Sada, San Pedro Garza Garcia (MX); Armado Trujillo, Monterrery (MX); Eduardo Coronado, San Pedro Garza Garcia (MX)

(73) Assignee: Coflex S.A. de C.V., Monterrey (MX)

( * ) Notice: Subject to any disclaimer, the term of this patent is extended or adjusted under 35 U.S.C. 154(b) by 0 days.

(21) Appl. No.: 11/161,421

(22) Filed: Aug. 2, 2005

(65) Prior Publication Data

US 2005/0251903 A1    Nov. 17, 2005

Related U.S. Application Data

(62) Division of application No. 10/370,747, filed on Feb. 20, 2003.

(51) Int. Cl.
*E03D 11/16* (2006.01)

(52) U.S. Cl. .................. 4/252.5; 4/252.1; 4/252.4; 4/252.6

(58) Field of Classification Search ....... 4/252.1–252.6
See application file for complete search history.

(56) References Cited

U.S. PATENT DOCUMENTS

| | | | | |
|---|---|---|---|---|
| 310,298 | A * | 1/1885 | McFarland | 285/58 |
| 961,985 | A | 6/1910 | Cosgrove | |
| 2,976,543 | A | 3/1961 | Turner et al. | |
| 3,967,836 | A | 7/1976 | Izzi, Sr. | |
| 4,133,347 | A * | 1/1979 | Mercer | 4/321 |
| 4,191,407 | A * | 3/1980 | Bretone, Jr. | 285/56 |
| 4,799,713 | A | 1/1989 | Uglow | |
| 5,143,122 | A | 9/1992 | Adkins | |
| 5,291,619 | A * | 3/1994 | Adorjan | 4/252.6 |
| 5,297,817 | A | 3/1994 | Hodges | |
| 5,819,326 | A * | 10/1998 | Kobayashi et al. | 4/252.1 |
| 6,052,839 | A | 4/2000 | Teskey | |
| 6,070,910 | A * | 6/2000 | Hodges | 4/252.6 |
| 6,152,186 | A | 11/2000 | Arney et al. | |
| 6,327,717 | B1 | 12/2001 | Johnson et al. | |
| 6,332,632 | B1 | 12/2001 | Hodges | |
| 6,519,784 | B2 | 2/2003 | Carwile | |

(Continued)

*Primary Examiner*—Khoa D. Huynh
(74) *Attorney, Agent, or Firm*—Baker & McKenzie LLP

(57) ABSTRACT

An improved water closet flange for connection to a plumbing fixture is described. The improved flange comprises an anchoring element or outer flange, connected to a flexible conduit tube or flexible sleeve, in which is attached an O-ring type of gasket. The improved flange connects a toilet bowl outlet to a waste drainpipe outlet without any flow reduction in between both connecting elements. The improved flange allows the connection between a toilet bowl discharge and a well placed vertical waste drainpipe. The improved flange also allows the connection between a toilet bowl discharge and a waste drainpipe outlet that is offset, horizontally oriented, or diagonally placed. The improved flange may further comprise an O-ring type of gasket disposed on the exterior of the flexible sleeve to provide a tight seal between the outer surface of the flexible sleeve and the inner surface of a waste drainpipe. The flexible sleeve can be implemented in a variety of sizes or diameters, including, for example, 3 inch (7.5 cm) and 4 inch (10 cm) diameters. An alternative embodiment of the flexible sleeve can fit either 3 inch or 4 inch drainpipes with the help of an appropriate O-ring seal of the appropriate dimensions.

25 Claims, 15 Drawing Sheets

U.S. PATENT DOCUMENTS 6,634,034 B2 * 10/2003 Rendell .................. 4/252.4
6,719,294 B2    4/2004 Nguyen et al.

2002/0020007 A1 * 2/2002 Johnson et al. .............. 4/252.5

* cited by examiner

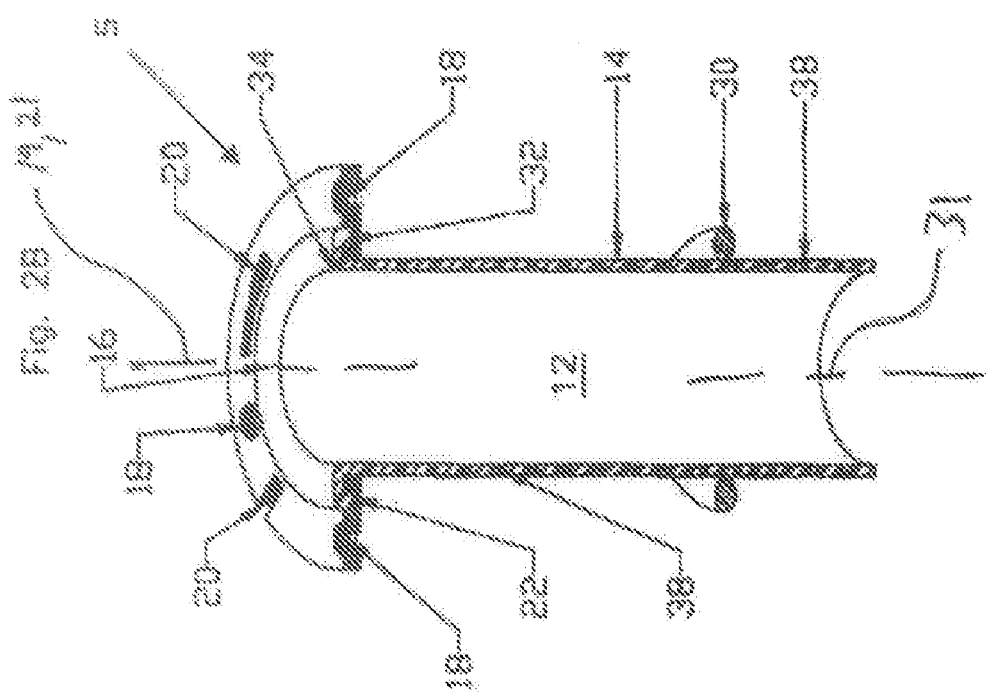

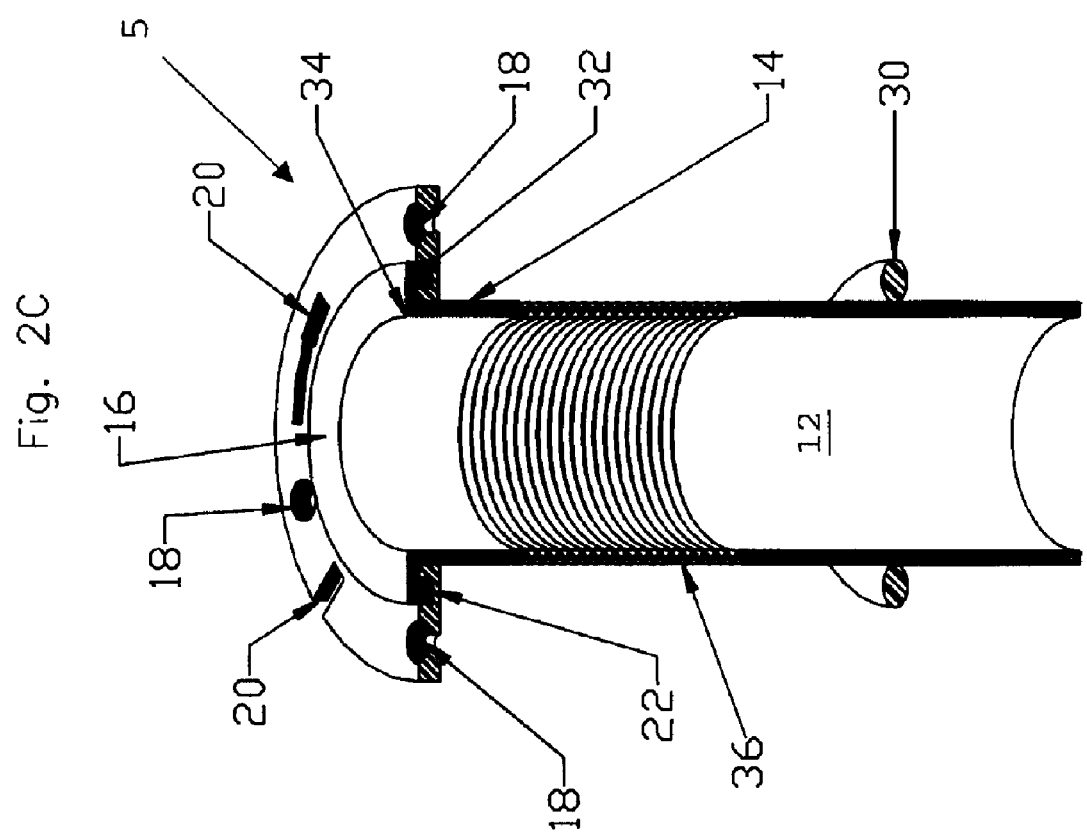

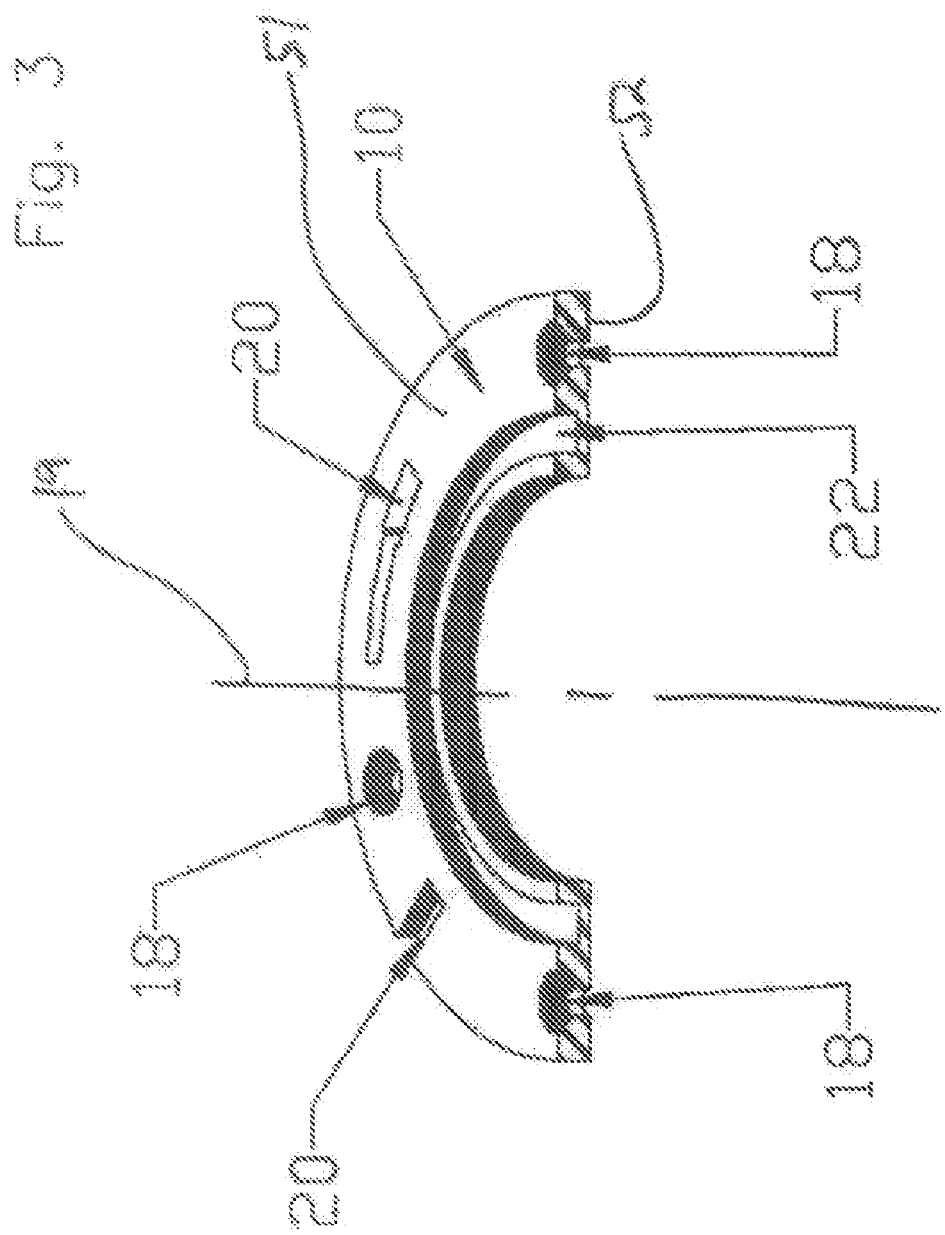

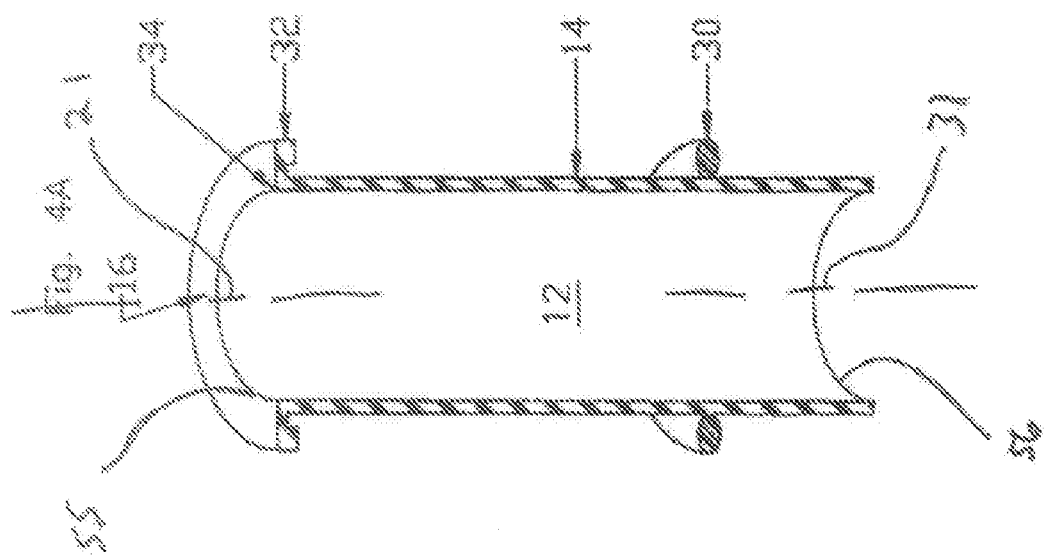

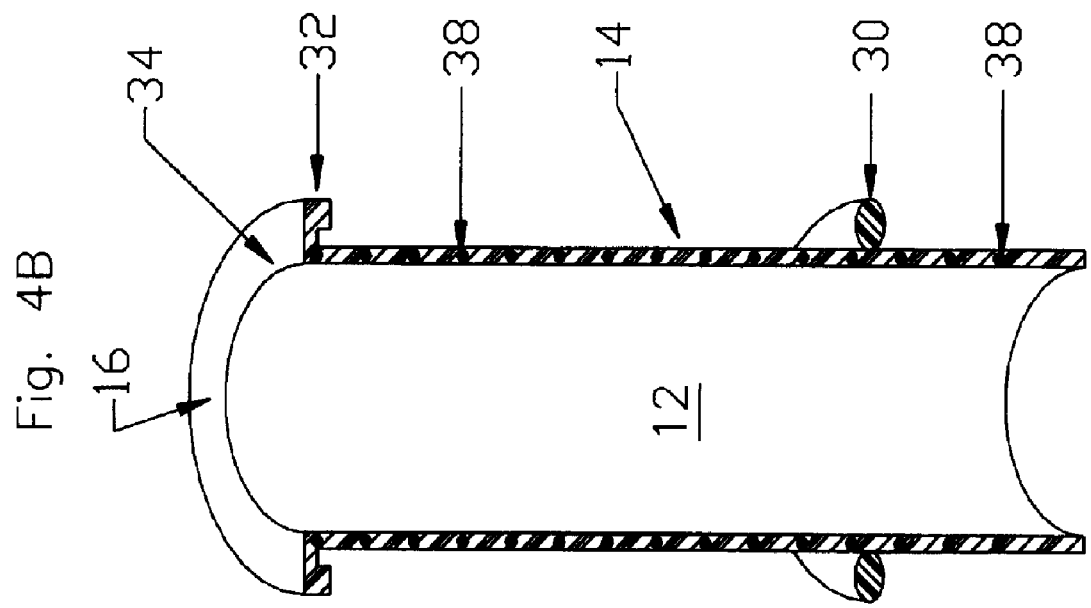

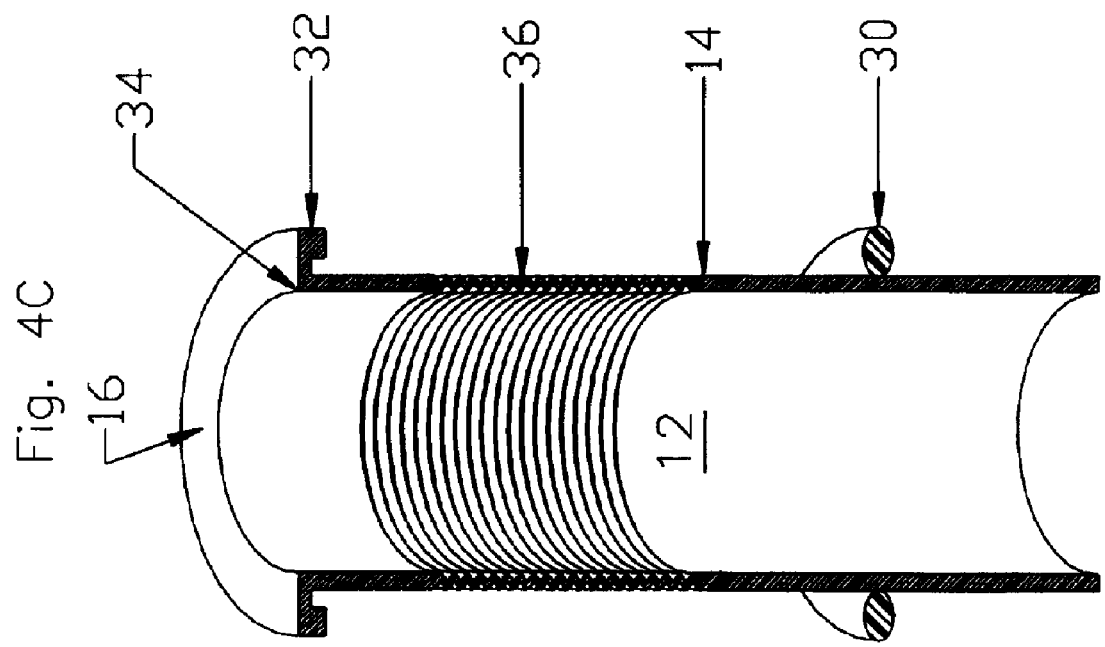

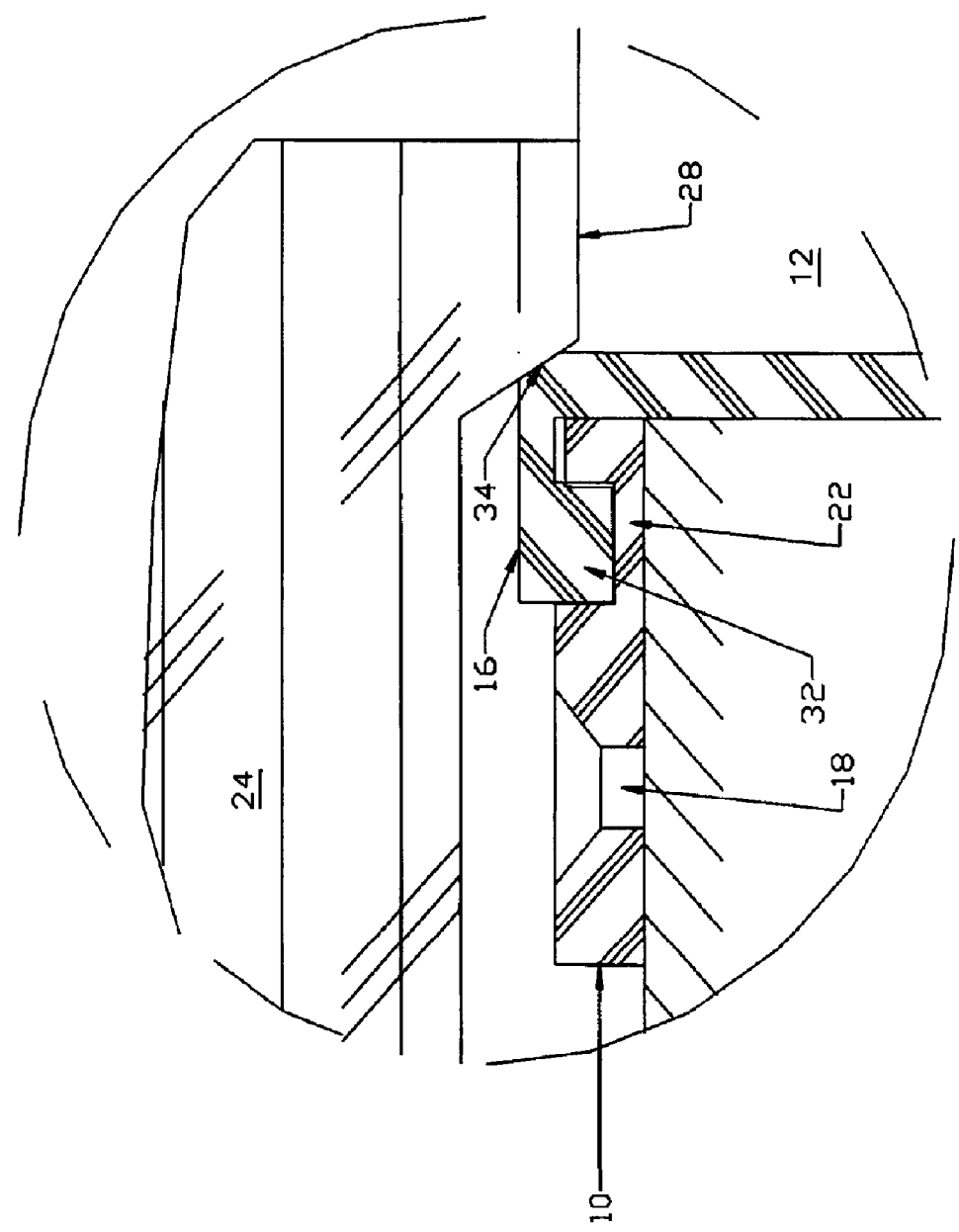

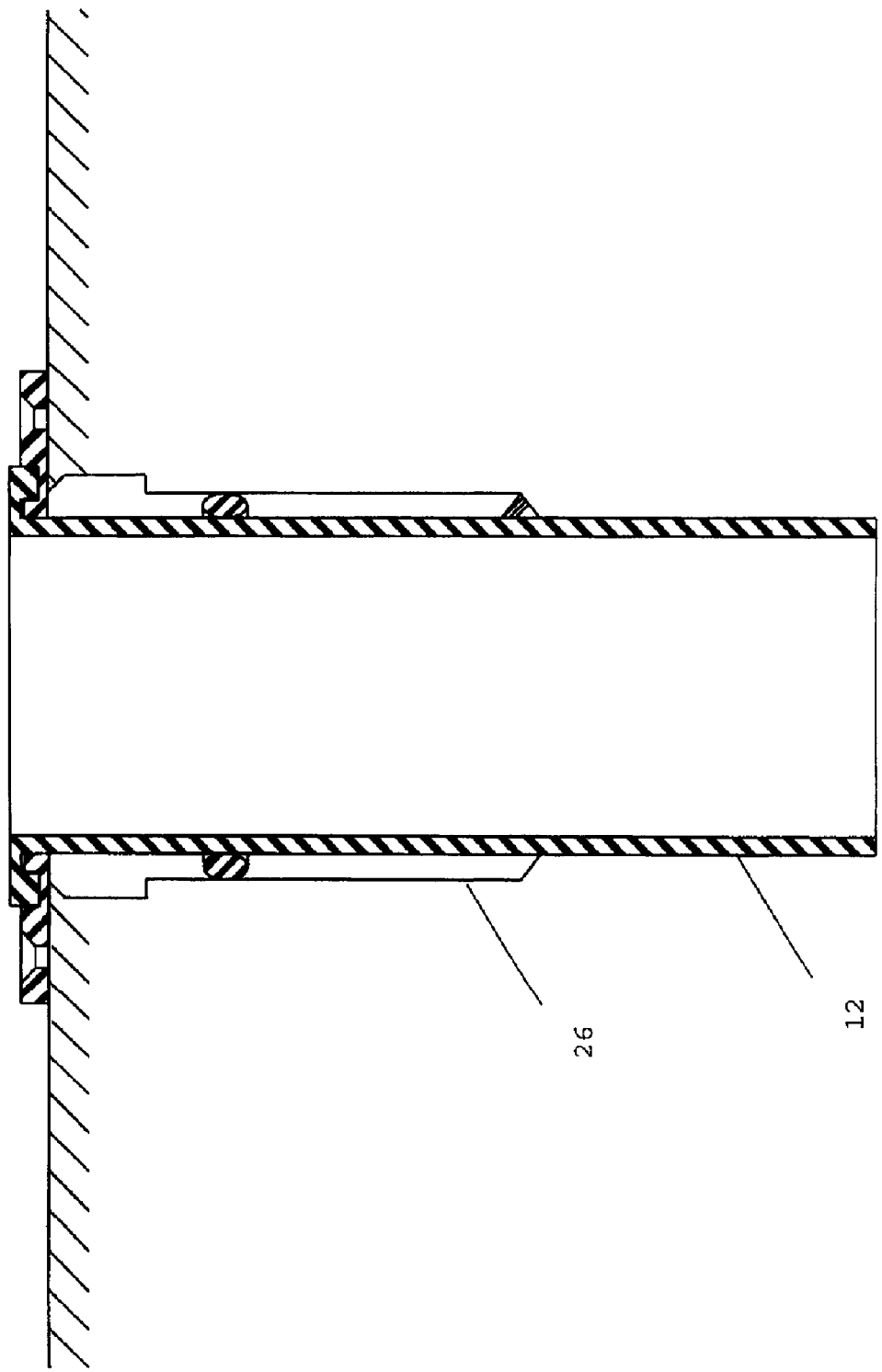

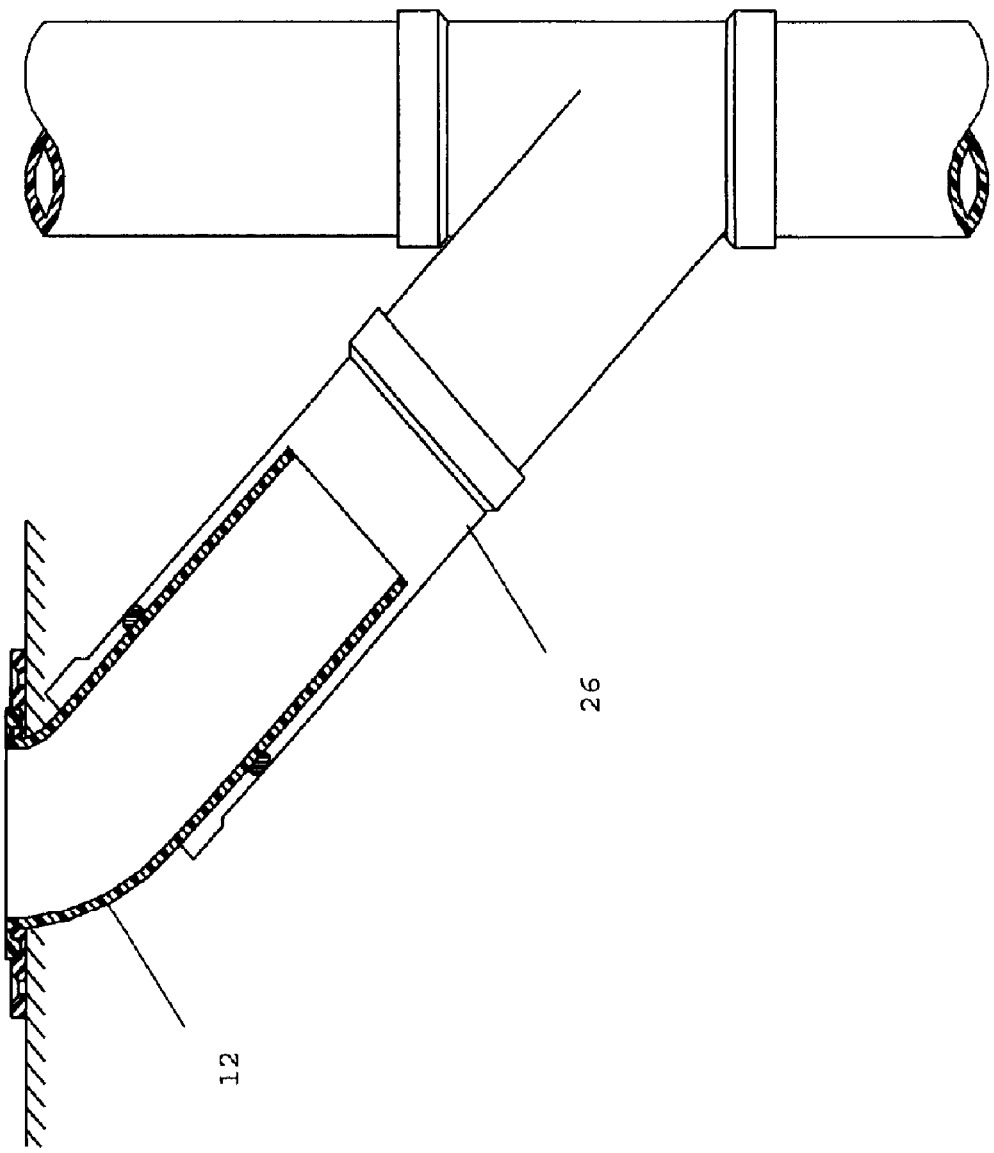

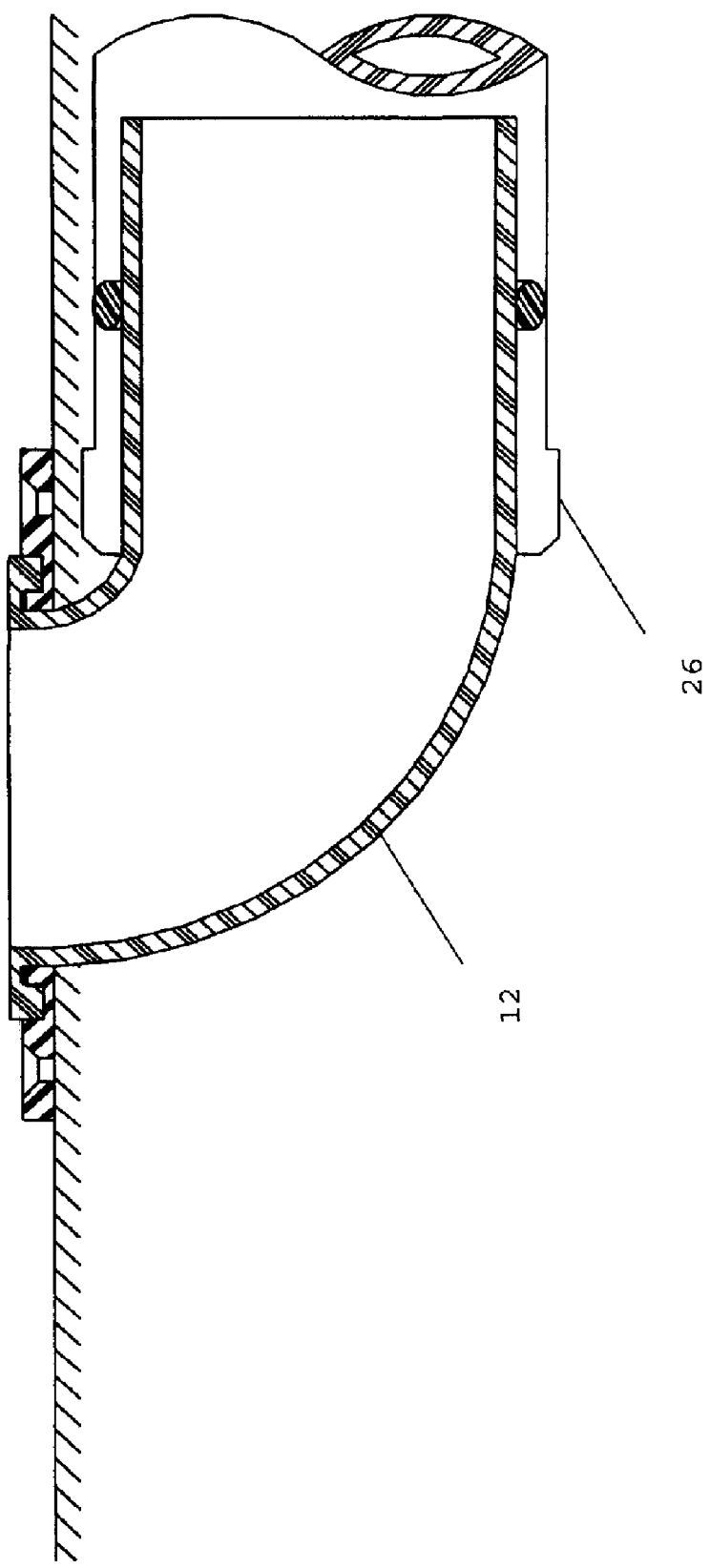

FLEXIBLE SLEEVE FOR CONNECTION TO A PLUMBING FIXTURE

CROSS-REFERENCE TO RELATED APPLICATIONS

This application is a divisional of U.S. application Ser. No. 10/370,747 filed Feb. 20, 2003, entitled "Improved Flexible Sleeve for Connection to a Plumbing Fixture," which is incorporated by reference herein in its entirety for all purposes.

FIELD OF THE INVENTION

This application relates generally to devices for connecting plumbing fixtures to waste drain conduits, and more particularly to the combination of a specially configured flexible sleeve and a closet flange, which mounts a water closet (toilet) on a supporting floor surface and also provides a tight sealed interconnection between the water closet (toilet) and the water waste drain pipe, allowing a good connection even between uneven outlets.

BACKGROUND

Water closets, also called toilets, are waste disposal devices commonly installed in most bathrooms. These kinds of plumbing appliances generally have a water storing receptacle called a water tank that is attached to a siphon seat-shaped bowl called toilet bowl. Periodically, waste is removed from the toilet bowl by flushing, thereby allowing water to drain from the water tank through the toilet bowl and into a waste drainpipe. In order to work, however, the toilet bowl must be connected to the waste drainpipe by fluid carrying conduits. Typically, the toilet bowl will sit flat on a floor and connect with a water closet outer flange. The water closet outer flange in turn connects with conduits leading to a waste drainpipe.

Existing toilet flanges often include a conduit portion for passing the waste fluids through the floor (upon which the toilet sits), a number of openings to fasten the flange to the floor, and other openings to attach the toilet bowl to the flange itself. Additionally, there may be an appropriate seat for a toilet seal, which typically may be made either from wax or by a relatively high-density foam or rubber.

Toilets are installed and located in accordance with interior decorating aesthetics of the bathroom. The location of the toilet is determined by the location of the waste drainpipe in the floor, and logically, this will determine the location of the toilet bowl discharge and hence the location of the outlet flange. However, in making openings through floors and in making the connection between the toilet bowl discharge and the waste drainpipe, there is some likelihood that the toilet bowl opening will be in an awkward or inconvenient place. An example would be where the toilet discharge opening has to be directly above a floor beam or too close to a wall. To overcome such problems there have been provided, in the past, offset flanges for toilet bowls. Examples of such offset flanges include the flanges depicted in U.S. Pat. Nos. 3,967,836 and 6,052,839. These prior offset flanges attempt to overcome the problems associated with positioning of the toilet bowl outlet pipe by positioning the conduit at one end of the flange adjacent to one lateral edge of the flange. In this way, the toilet bowl outlet pipe can be positioned adjacent to a beam or tight against a wall or other obstacle without much inconvenience.

A problem associated with the previously described apparatuses is that even though they provide some flexibility, both are comprised of rigid connecting conduits, and therefore provide limited flexibility and depth connection distances. For example, U.S. Pat. No. 3,967,836 has a maximum offset of 1¾" (one and three quarter inches), which cannot be exceeded; and U.S. Pat. No. 6,052,839 requires a larger maximum offset. But the problem with the apparatus described in U.S. Pat. No. 6,052,839 is its minimum offset. More specifically, because it has a connecting rigid conduit in the shape of an elbow, its use is limited to angled connections. Moreover, this shape requires that the vertical distance between the toilet bowl discharge and the waste drain pipe outlet should be at least about 5–6 inches deep.

Because of the rigidity of the conduit portions of the closet flanges that are currently available, there are several problems related with offset, angled and uneven installations. Most professionals who deal with these kinds of problems turn to modifying the waste drain line or change the toilet for a bigger or smaller one, depending on the case. Those solutions are expensive and can cause delays in the installation process.

To address these problems, an improved water closet flange is hereby disclosed. The improved flange has a flexible conduit (i.e. sleeve) portion for carrying fluids and connecting to the waste drain pipe outlet, and such a flexible sleeve will facilitate its installation even between offset, uneven or angular outlets.

BRIEF SUMMARY

Disclosed herein is an improved flange apparatus for connection to a plumbing fixture, such as a toilet, wherein the improved flange may comprise an anchoring element or outer flange that is connected to a flexible conduit tube or flexible sleeve, to which is attached an O-ring type of gasket. The improved flange can connect a toilet bowl outlet to a waste drainpipe outlet without any flow reduction between both connecting elements. A further aspect of the improved flange allows the connection between a toilet bowl discharge and a waste drainpipe outlet that are not aligned with each other. Another aspect of the improved flexible sleeve allows the connection between a toilet bowl discharge and a horizontal waste drainpipe outlet. A further aspect of the flexible sleeve prevents any type of leakage or dripping between the toilet bowl discharge and the waste drainpipe outlet. Another aspect of the flexible sleeve is an outer flange element able to firmly anchor a plumbing fixture to a surface. Yet another aspect of the improved flange eliminates the need for using a wax seal or a rubber foam seal in the installation of a toilet, because of the seal provided by the joint between the toilet outlet and the flexible sleeve. A further aspect of the improved flange is an O-ring type of gasket mounted on the flexible sleeve that provides a tight seal between the outer surface of the flexible sleeve and the inner surface of the waste drainpipe in which is connected. Another aspect of the improved flange is the connection between the flexible sleeve and the inner surface of the waste drainpipe, which does not need any kind of gluing or cementing to provide a hermetic seal. The flexible sleeve can be implemented in a variety of sizes or diameters, including, for example, 3 inch (7.5 cm) and 4 inch (10 cm) diameters. An alternative embodiment of the flexible sleeve can fit either 3 inch or 4 inch drainpipes with the help of an appropriate O-ring seal with the appropriate dimensions.

These aspects of the improved flange are described only for the purpose of clarifying the nature of the present invention. Furthermore, several exemplary embodiments of the invention are illustrated in the below-described figures of the accompanying drawings and are described in detail hereinafter. These embodiments are to be taken as representative of the multiple embodiments of the invention that lie within the scope of the invention.

BRIEF DESCRIPTION OF THE DRAWINGS

FIG. 2B is a schematic isometric cross-sectional view of an improved flange apparatus taken from line 2—2 of FIG. 1A that also depicts an internal structure.

FIG. 2C is a schematic isometric cross-sectional view of an improved flange apparatus taken from line 2—2 of FIG. 1B.

FIG. 3 is an alternative schematic isometric cross-sectional view of an outer flange taken from line 2—2 of FIG. 1.

FIG. 4A is a schematic isometric cross-sectional view of one embodiment of an improved flexible sleeve taken from line 2—2 of FIG. 1A.

FIG. 4B is a schematic isometric cross-sectional view of one embodiment of an improved flexible sleeve taken from line 2—2 of FIG. 1A that also depicts an internal structure.

FIG. 4C is a schematic isometric cross-sectional view of one embodiment of an improved flexible sleeve taken from line 2—2 of FIG. 1B.

FIG. 5A is an enlarged partial sectional view of the embodiment shown in FIG. 5.

FIG. 6 is a cross-sectional side view of an improved flexible sleeve installed in a vertically oriented waste drainpipe.

FIG. 7 is a side view of an improved flexible sleeve installed in diagonally oriented waste drainpipe.

FIG. 9 is a side view of an improved flange apparatus installed in a horizontally oriented waste drainpipe.

DETAILED DESCRIPTION

Figure 1A:
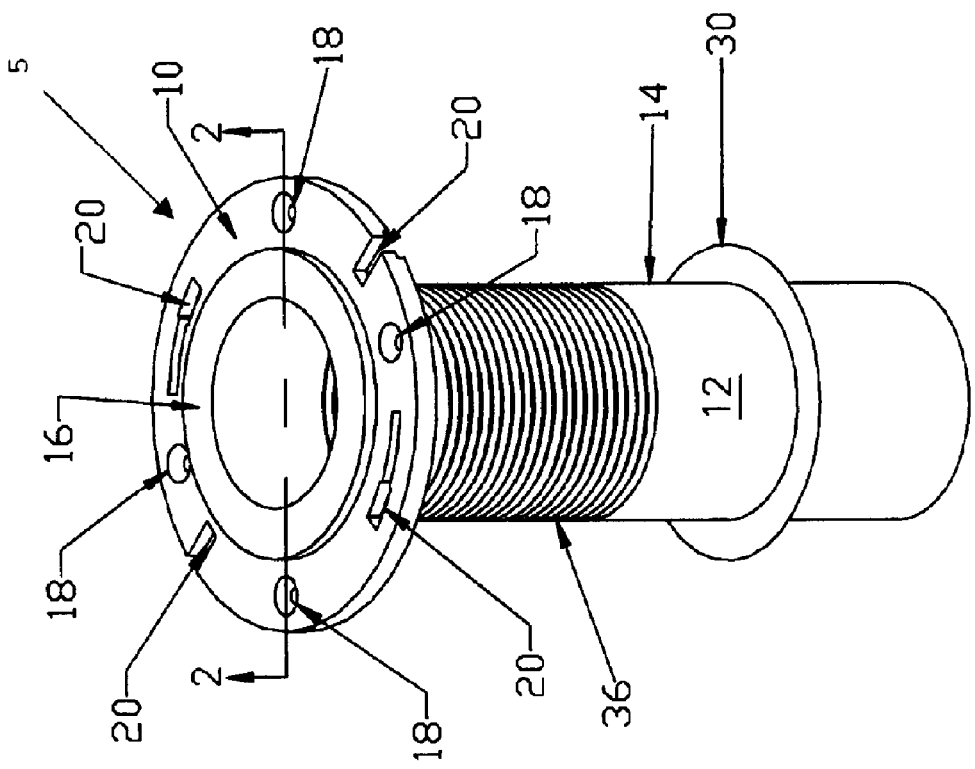
FIG. 1A is a schematic isometric perspective view of one embodiment of an improved flange apparatus.
Figure 1B:
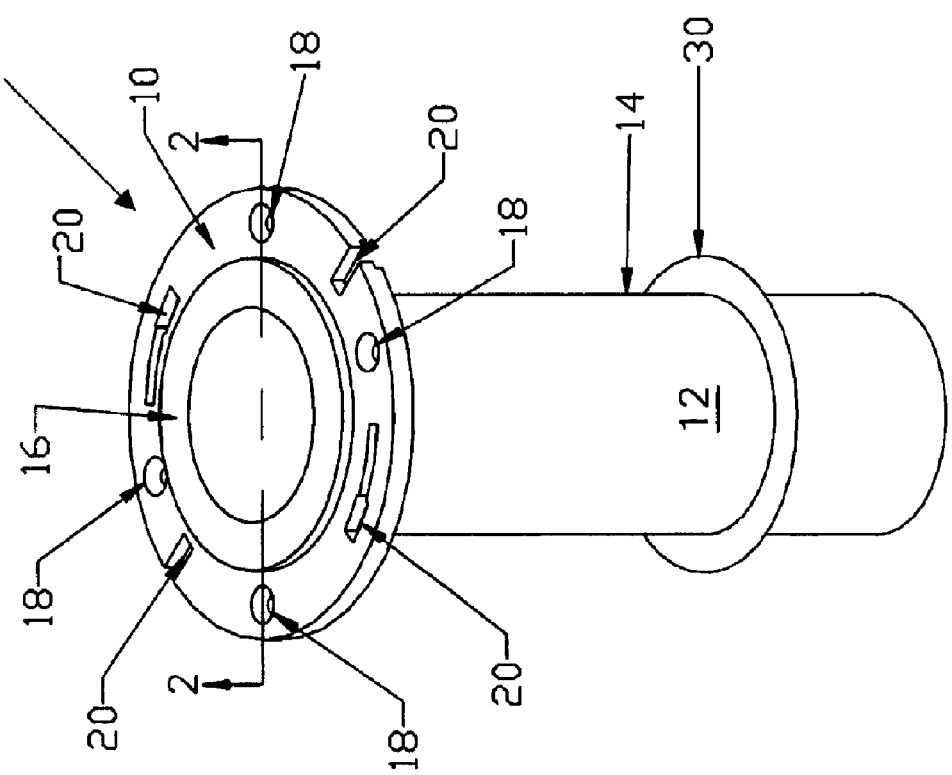
FIG. 1B is a schematic isometric perspective view of one embodiment of an improved flange in which the flexible sleeve comprises a corrugated material.
Figure 2A:
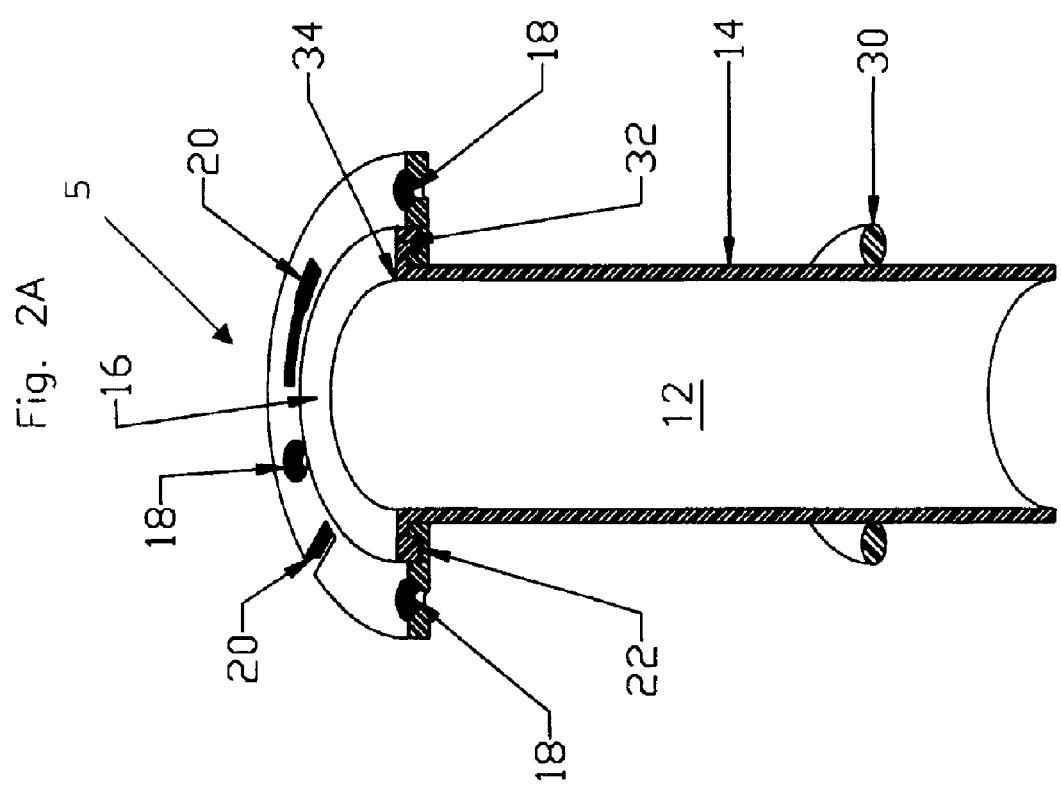
FIG. 2A is a schematic isometric cross-sectional view of an improved flange apparatus taken from line 2—2 of FIG. 1A.

FIGS. 1A–2C depict several alternative embodiments of the improved flange. In particular, FIGS. 1A–1B depict schematic isometric perspective views of the improved flange. Cross-sectional views of the flanges depicted in FIGS. 1A–1B are also depicted in FIGS. 2A–2C. In each of these figures, the improved flange 5 comprises an outer flange 10 attached to a flexible sleeve 12 with an attaching lip 32, which is part of the upper portion of the sleeve 16. The attaching lip 32 is seated in the radial groove 22 and forms a seal between the attaching lip 32 and the outer flange 10. In addition, the flexible sleeve 12 has an O-ring type seal 30 that is mounted around the flexible conduit portion 14. The O-ring seal 30 can comprise a plurality of O-rings, such as ten O-rings, one to four O-rings, or only one O-ring.

As clearly shown in FIGS. 1A, 2B, and 3, the outer flange 10 is substantially cylindrical in shape, having a linear longitudinal axis 19 (shown explicitly in FIG. 3) extending along the centerline of the outer flange 10 from its first end 51 to its second end 52. The flexible sleeve 12 is attached to the outer flange 10 and connects the plumbing fixture discharge (as from a toilet, for example), attached via the outer flange, to the waste drain pipe outlet, with the sleeve's proximal end 55 corresponding to the plumbing fixture discharge and its distal end 56 corresponding to the waste drain pipe outlet. The proximal and distal ends of the sleeve each have a longitudinal axis (21 and 31 respectively) that is colinear with the longitudinal axis 19 of the outer flange (and in FIG. 2B, the longitudinal axis 21 of the proximal end of the sleeve coincides with the linear longitudinal axis 19 of the outer flange) when the sleeve 12 is in an unflexed state, as shown in FIGS. 1A and 2B.

The flexible sleeve could be made in two different outside diameter sizes in order to fit into the two most commonly used types of waste drainpipes. For 4 inch drainpipes, the outside diameter of the flexible sleeve 12 can be between 3.125 to 4.250 inches, 3.750 to 4.125 inches, or 4.125 inches. For 3 inch drainpipes, the outside diameter of the flexible sleeve can be between 2.250 to 3.750 inches, or about 3.000 inches.

The O-rings used for connecting a flexible sleeve 12 having a 4 inch nominal external diameter with a waste drainpipe having a 4 inch diameter can have an internal diameter between 1 to 5 inches, or between 3 inches and 4.250 inches, or about 3.250 inches. The O-rings used for connecting a flexible sleeve 12 having a 4 inch nominal external diameter with a 4 inch waste drainpipe can have an external diameter between 2 and 6 inches, between 3 and 4.750 inches, or about 4.4 inches. The O-rings used for connecting a flexible sleeve having a 3 inch external diameter with a regular 3 inch waste drainpipe, can have an internal diameter between 0.75 and 4 inches, or an internal diameter between 1.5 and 3.5 inches, or an internal diameter of about 2.4 inches. By using bigger O-rings, flexible sleeves having a 3 inch external diameter can be connected to a regular 4 inch waste drainpipe, resulting in a product that fits most drain pipes.

The O-rings used for connecting a flexible sleeve having a 3 inch external diameter with a 4 inch diameter waste drainpipe can have an internal diameter between 0.75 inches and 4 inches, or a internal diameter between 1.5 inches and 3.5 inches, or an internal diameter of about 2.4 inches. The O-rings used for connecting a flexible sleeve having a 3 inch external diameter with a 4 inch diameter waste drainpipe can also have an external diameter between 2 and 6 inches, or an external diameter between 3 and 4.75 inches, or an external diameter of about 4.4 inches.

The flexible sleeve should be flexible enough to support the installation between a plumbing fixture and an offset, angled, or misaligned waste drain pipe. Accordingly, the hardness of its materials can range from 35 shore A to 90 shore A, or from 35 shore A to 55 shore A, or more specifically about 40 shore A. The length of the flexible sleeve 12 can be between 2 and 30 inches, or between 6 and 15 inches, or more specifically about 12 inches. The thickness of the flexible sleeve may also be between about 0.040 to about 0.400 inches, or between about 0.100 and about 0.350 inches, or more specifically about 0.200 inches.

FIG. 1B depicts a schematic isometric perspective view of an improved flange 5 comprising a corrugated portion 36 on the upper portion of the flexible sleeve 12. The corrugated portion 36 helps to avoid any kinking of the flexible sleeve 12 when it is installed in an offset, diagonal, horizontal, or angular arrangement. The corrugated portion 36 of flexible sleeve 12 can comprise as little as 1/6 of the sleeve's length or it can comprise the entire length of the flexible sleeve. The corrugated portion 36, however, preferably comprises 1/4 to 1/2 of the total length of the flexible sleeve 12, and more preferably 1/3 of the total length of the flexible sleeve 12.

FIG. 2B depicts a schematic isometric cross-section view of an improved flexible closet flange, taken from the line 2—2 in FIG. 1A. In FIG. 2B, an internal structure 38 is depicted that can comprise a longitudinally coiled wire or a set of rings. This embodiment can be utilized whenever the positioning of the flexible closet flange inside the drainpipe could result in shrinkage of the inside diameter of the flexible sleeve 12 as a result of kinking or other deformations. This shrinkage can result in the accumulation of waste products inside the sleeve, eventually leading to an undesirable drainage jam.

FIG. 2C depicts a schematic isometric cross-sectional view of an improved flange 5, taken from line 2—2 in FIG. 1B wherein the flexible sleeve 12 comprises a corrugated portion 36. The corrugated potion 36 allows the flexible sleeve 12 be mounted to offset, angled, or diagonally positioned drain pipes while minimizing kinking or other deformations.

FIG. 3 depicts a cross-sectional perspective view of an outer flange piece 10. The outer flange 10 can include one or more apertures 18 for fasteners that secure the outer flange 10 to a surface, such as a floor, as well as one or more other apertures 20 for fasteners that secure the outer flange 10 to a plumbing fixture, such as a toilet bowl. The outer flange can also comprise a radial groove 22 in which the attaching lip 32 (shown on FIG. 4) of the flexible sleeve 12 (also shown on FIG. 4) will sit.

FIG. 4A depicts an isometric cross-sectional view of the flexible sleeve 12 with an O-ring 30 attached around the flexible conduit portion 14. Also shown in FIG. 4 is the upper portion of the sleeve 16, which is comprised of the attaching lip 32 and a sealing surface 34. The flexible sleeve 12 can be comprised of any thermoplastic rubber, any engineering polymer, or any chemical treated materials capable of resisting chemicals such as chlorides and acids such as a PVC compound. The flexible sleeve 12 should also be able to resist organic gases and fungus attacks. The flexible sleeve 12 can be made of flexible materials, corrugated materials, or a combination of both, and it can be extruded, vulcanized, or molded. The flexible sleeve 12 should be flexible enough to support the installation between a toilet and an offset, or unfair, or angled installed waste drain pipe, the hardness of its materials can range from 35 shore A to 90 shore A, from 35 shore A to 55 shore A, or more specifically about 40 shore A. The length of the flexible sleeve 12 can be between 2 to 30 inches, or between 6 and 15 inches, and more specifically about 12 inches. Depending upon the type of installation, the flexible sleeve 12 can be used without the outer flange 10. The O-rings 30 can be molded as a part of the conduit portion of the flexible sleeve 12, or they may be fused, sonic welded, glued, or can be independent from the sleeve with free displacement movement along the external face of the flexible sleeve 12.

An alternative embodiment of a flexible sleeve 12 is depicted in FIG. 4B. In FIG. 4B, an internal structure 38 comprising a longitudinally coiled wire or a set of rings is disposed within the wall of the flexible sleeve 12. This embodiment can be utilized whenever the positioning of the flexible closet flange inside the drainpipe could result in a shrinkage of the inside diameter of the sleeve due to kinking or other deformation. This shrinkage can result in the accumulation of waste products inside the sleeve, eventually leading to a drainage jam.

Another alternative embodiment of the flexible sleeve 12 is depicted in FIG. 4C. In FIG. 4C, the flexible sleeve 12 further comprises a corrugated portion 36 that facilitates the installation of the flexible sleeve into an offset, diagonal, or horizontal arrangement. The corrugated portion 36 allows the flexible sleeve 12 to be mounted in such arrangements while minimizing the effects of kinking and shrinkage of the inside diameter of the sleeve.

Figure 5:
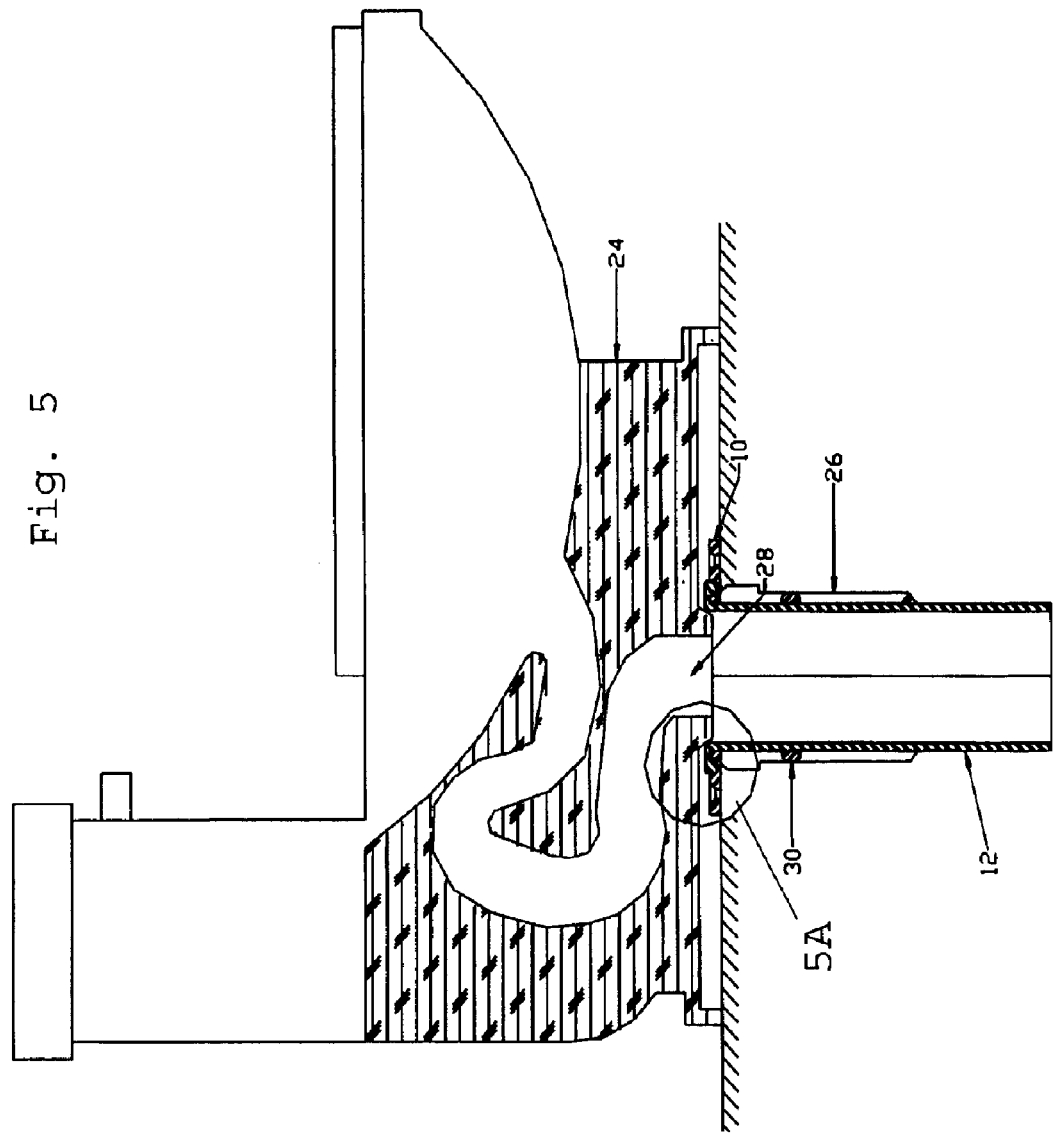
FIG. 5 is a cross-sectional view of an improved flange apparatus in its operative position between a toilet bowl and a waste drainpipe.

FIG. 5 is a cross-sectional side view of the improved flange in its operative position between a toilet bowl 24 and a waste drain pipe 26. The outer flange 10 anchors the toilet bowl 24 to a floor, and firmly grips the flexible sleeve 12, which fits inside the waste drain pipe 26. In addition, the O-ring 30 creates a seal against the inner surface of said waste drain pipe 26. The materials for the outer flange 10 can be any ferrous or non-ferrous metals, ABS, PVC or any other type of hard synthetic plastic. The outer flange may have or may not have a radial groove on it, all depending in the type of application or use that the flexible closet flange is going to be put through.

FIG. 5A is an enlarged partial view of the embodiment shown in FIG. 5. In FIG. 5A, the seal between the toilet discharge outlet 28 and the sealing surface 34 on the upper portion 16 of the flexible sleeve 12 eliminates the need for regular wax seals or foam rubber gaskets. When the toilet 24 is fastened to the outer flange 10, the toilet discharge outlet 28 will be pushed against the sealing surface 34 on the upper portion of the sleeve 16, thereby creating a firm and tight seal that will prevent gas and fluids from leaking from the drain pipe to the floor in which the toilet bowl 24 is seated.

FIGS. 6–10B show different installments and embodiments in which the improved flange can be used. FIG. 6 is a cross-sectional side view of one kind of installation between the flexible sleeve 12 and a vertically installed waste drainpipe 26. Although this kind of installation is preferred, the conditions permitting this kind of installation are not always available. This is problematic because most water closet flanges are designed to be installed under these conditions (with a vertically aligned waste drainpipe), and do not allow any misalignment between the toilets and waste drainpipes outlets.

FIG. 7 is a cross-sectional side view of an installation between the flexible sleeve 12 and a diagonally installed waste drainpipe 26. The flexible sleeve is advantageous because it can be readily adapted to connect to a drainpipe 26 that is disposed at a non-vertical angle without any additional equipment or materials.

Figure 8:
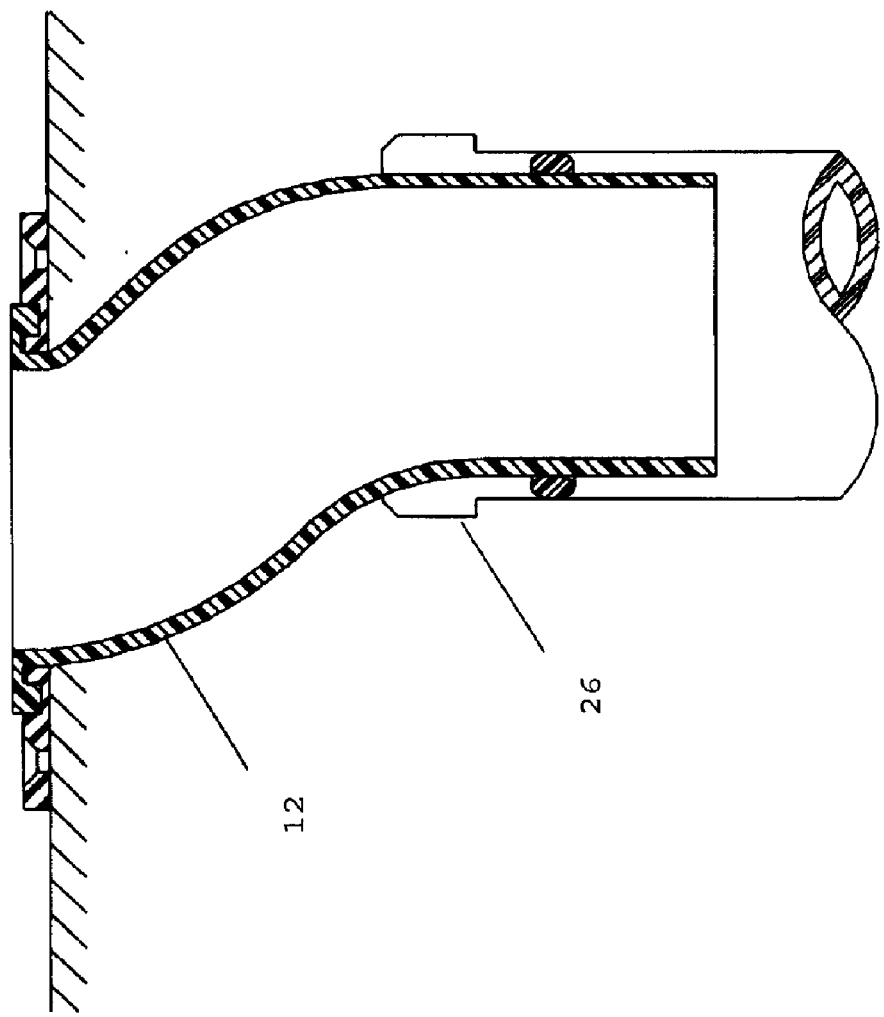
FIG. 8 is a side view of an improved flange apparatus installed in a horizontally offset waste drainpipe.

FIG. 8 is a cross-sectional side view of an installation between the flexible sleeve 12 and an offset waste drainpipe 26. As stated previously, the flexible sleeve 26 can be readily adapted to connect an offset waste drainpipe 26 without any additional equipment or materials.

FIG. 9 is a cross-sectional side view of an installation between the flexible sleeve 12 and a horizontally-installed waste drainpipe 26. Again, the flexible sleeve 26 can be readily adapted for the situation where the drainpipe 26 is horizontally disposed without any additional equipment or materials.

Figure 10A:
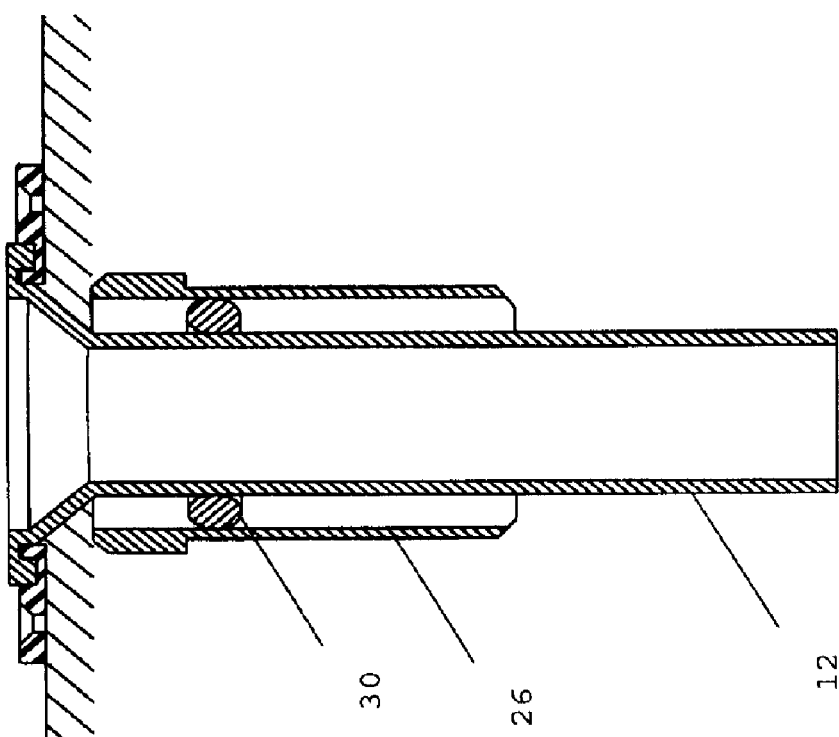
FIG. 10A is a side view of an improved flange apparatus having a 3 inch external diameter that is installed in a vertically oriented 3 inch waste drainpipe.
Figure 10B:
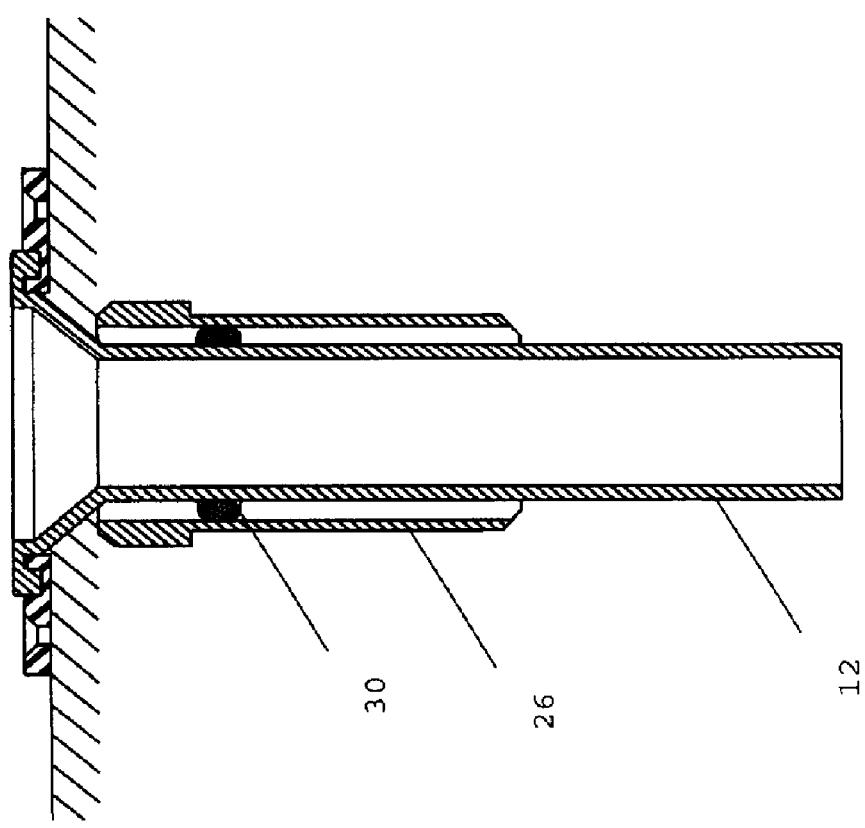
FIG. 10B is a side view of an improved flange apparatus having a 3 inch external diameter that is installed in a vertically oriented 4 inch waste drainpipe.

FIG. 10A is a cross-sectional side view of an installation between a 3 inch flexible sleeve 12 and a vertically-installed 3 inch waste drainpipe. In FIG. 10A, an O-ring 30 creates a seal against the inner surface of the 3 inch waste drain pipe 26. FIG. 10B is a cross-sectional side view of an installation between a 3 inch flexible sleeve 12 and a vertically-installed 4 inch waste drainpipe. Much like FIG. 10A, an O-ring 30 creates a seal against the inner surface of the 4 inch waste drain pipe 26. It is contemplated that one kind of O-ring 30 may be utilized to form an effective seal for both 3 inch and 4 inch drain pipes, thereby eliminating the need for additional adapters or parts.

Although preferred embodiments of the present inventions have illustrated in the accompanying drawings and described in the foregoing detailed description, it will be understood that the inventions are not limited to the embodiments disclosed, but are capable of numerous rearrangements, modifications and substitutions without departing from the spirit of the invention as set forth and defined by the following claims and equivalents thereof. Applicant intends that the claims shall not invoke the application of 35 U.S.C. § 112, 6 unless the claim is explicitly written in means-plus-function or step-plus-function format.

What is claimed is:

1. A flange operable to connect a plumbing fixture discharge to a waste drain pipe outlet, the flange comprising:
    an outer flange operable to anchor a plumbing fixture to a surface, the outer flange having a linear longitudinal axis from a first end of the outer flange to a second end of the outer flange; and
    a flexible sleeve extending from the outer flange, the sleeve having a proximal end corresponding to the plumbing fixture discharge and a distal end corresponding to the waste drain pipe outlet, the proximal and distal ends of the sleeve each having a longitudinal axis colinear with the longitudinal axis of the outer flange when the sleeve is in an unflexed state, the sleeve being operable to provide a conduit for fluids from the plumbing fixture discharge to the waste drain pipe outlet, the sleeve being fabricated from a flexible material and having a corrugated portion to aid flexibility of the sleeve in connecting between the plumbing fixture discharge and the waste drain pipe outlet, the corrugated portion being spaced from the distal end of the sleeve by at least a non-corrugated portion.

2. A flange according to claim 1, further comprising a sealing member disposed on an outer surface of the sleeve, wherein the sealing member is operable to form a seal between the sleeve and an inner surface of the waste drain pipe.

3. A flange according to claim 2, wherein the sealing member provides a hermetic seal between the outer surface of the sleeve and the inner surface of the waste drain pipe.

4. A flange according to claim 2, wherein the sealing member comprises an O-ring.

5. A flange according to claim 2, wherein the sealing member comprises a sealing member molded as part of the sleeve.

6. A flange according to claim 2, wherein the sealing member is longitudinally displaceable along the sleeve.

7. A flange according to claim 1, wherein the sleeve comprises an upper portion having an inner sealing surface operable for the plumbing fixture discharge to be seated creating a hermetic seal.

8. A flange according to claim 1, wherein the outer flange comprises an annular plate body having:
    an upper surface operable to retain and attach an upper portion of the sleeve;
    a lower surface operable to be placed in contact with a floor surface;
    at least two first apertures extending through the outer flange between the upper surface and the lower surface, the first apertures being operable to retain fasteners for securing the outer flange to the floor surface; and
    at least two second apertures extending through the outer flange between the upper surface and the lower surface, the second apertures being operable to retain fasteners connecting the outer flange to a plumbing fixture.

9. A flange according to claim 1, wherein the outer flange and the sleeve are permanently affixed to each other.

10. A flange according to claim 9, wherein the outer flange and the sleeve are molded as a singular piece.

11. A flange according to claim 1, wherein the sleeve comprises a material having a hardness in the range of about 35 shore A to about 75 shore A.

12. A flange operable to connect a plumbing fixture discharge to a waste drain pipe outlet, the flange comprising:
    an outer flange operable to anchor a plumbing fixture to a surface, the outer flange having a linear longitudinal axis from a first end of the outer flange to a second end of the outer flange; and
    a flexible sleeve extending from the outer flange, the sleeve having a proximal end corresponding to the plumbing fixture discharge and a distal end corresponding to the waste drain pipe outlet, the proximal and distal ends of the sleeve each having a longitudinal axis colinear with the longitudinal axis of the outer flange when the sleeve is in an unflexed state, the sleeve being operable to provide a conduit for fluids from the plumbing fixture discharge to a waste drain pipe outlet, the sleeve comprising:
    an upper portion having an inner sealing surface operable for the plumbing fixture discharge to be seated to create a hermetic seal; and
    a body fabricated from a flexible material and having a conduit portion adapted to fit inside a waste drain pipe outlet and a corrugated portion to aid flexibility of the sleeve in connecting between the plumbing fixture discharge and the waste drain pipe outlet, the corrugated portion being spaced from the distal end of the sleeve by at least a non-corrugated portion.

13. A flange according to claim 12, further comprising a sealing member disposed on an outer surface of the sleeve, wherein the sealing member is operable to form a seal between the sleeve and an inner surface of the waste drain pipe.

14. A flange according to claim 13, wherein the sealing member provides a hermetic seal between the outer surface of the sleeve and the inner surface of the waste drain pipe.

15. A flange according to claim 12, wherein the outer flange comprises an annular plate body having:
    an upper surface operable to retain and attach an upper portion of the sleeve;
    a lower surface operable to be placed in contact with a floor surface;
    at least two first apertures extending through the outer flange between the upper surface and the lower surface, the first apertures being operable to retain fasteners for securing the outer flange to the floor surface; and
    at least two second apertures extending through the outer flange between the upper surface and the lower surface, the second apertures being operable to retain fasteners connecting the outer flange to a plumbing fixture.

16. A flange according to claim 12, wherein the outer flange and the sleeve are permanently affixed to each other.

17. A flange according to claim 16, wherein the outer flange and the sleeve are molded as a singular piece.

18. A method for connecting a plumbing fixture discharge to a waste drain pipe outlet, the method comprising:
   disposing an outer flange on a surface, the outer flange operable to anchor a plumbing fixture to the surface, the outer flange having a linear longitudinal axis from a first end of the outer flange to a second end of the outer flange, the outer flange having a flexible sleeve extending therefrom, the sleeve having a proximal end corresponding to the plumbing fixture discharge and a distal end corresponding to the waste drain pipe outlet, the proximal and distal ends of the sleeve each having a longitudinal axis colinear with the longitudinal axis of the outer flange when the sleeve is in an unflexed state, the sleeve being fabricated from a flexible material and further having a corrugated portion to aid flexibility of the sleeve, the corrugated portion being spaced from the distal end of the sleeve by at least a non-corrugated portion, and the sleeve providing a conduit for fluids from the plumbing fixture discharge to the waste drain pipe outlet; and
   disposing at least a portion of the sleeve in the waste drain pipe outlet, thereby establishing fluid communication from the plumbing fixture discharge, through the sleeve and to the waste drain pipe outlet.

19. A method according to claim 18, further comprising disposing a sealing member on an outer surface of the sleeve, the sealing member forming a seal between the sleeve and an inner surface of the waste drain pipe outlet.

20. A method according to claim 18, wherein the outer flange includes at least two apertures formed there through, and wherein disposing the outer flange on a surface further comprises inserting fasteners through the apertures to secure the flange to the surface.

21. A method according to claim 18, wherein the outer flange includes at least two apertures formed there through, and wherein disposing the outer flange on a surface further comprises inserting fasteners through the apertures to connect the flange to a plumbing fixture.

22. A flange operable to connect a plumbing fixture discharge to a waste drain pipe outlet, the flange comprising:
   an outer flange operable to anchor a plumbing fixture to a surface; and
   a flexible sleeve extending from the outer flange, the sleeve having a proximal end operable for the plumbing fixture discharge to be seated and a distal end adapted to fit inside the waste drain pipe outlet, the sleeve being unitary in construct and being operable to provide a conduit for fluids from the plumbing fixture discharge to the waste drain pipe outlet, the sleeve being fabricated from a flexible material and having a corrugated portion to aid flexibility of the sleeve in connecting between the plumbing fixture discharge and the waste drain pipe outlet, the corrugated portion being spaced from the distal end of the sleeve by at least a non-corrugated portion.

23. A flange according to claim 22, further comprising a sealing member disposed on an outer surface of the sleeve, wherein the sealing member is operable to form a seal between the sleeve and an inner surface of the waste drain pipe.

24. A flange according to claim 22, wherein the outer flange and the sleeve are permanently affixed to each other.

25. A flange according to claim 24, wherein the outer flange and the sleeve are molded as a singular piece.

* * * * *